US009348902B2

(12) United States Patent  (10) Patent No.: US 9,348,902 B2
Garera et al.  (45) Date of Patent: May 24, 2016

(54) AUTOMATED ATTRIBUTE DISAMBIGUATION WITH HUMAN INPUT

(71) Applicant: Wal-Mart Stores, Inc., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 566 days.

(21) Appl. No.: 13/754,802

(22) Filed: Jan. 30, 2013

(65) Prior Publication Data

US 2014/0214862 A1  Jul. 31, 2014

(51) Int. Cl.
G06F 7/00 (2006.01)
G06F 17/30 (2006.01)
G06Q 10/10 (2012.01)

(52) U.S. Cl.
CPC .......... *G06F 17/30722* (2013.01); *G06Q 10/10* (2013.01)

(58) Field of Classification Search
CPC .......... G06F 17/30705; G06F 17/3071; G06F 17/30722; G06F 17/30598; G06Q 50/01
USPC ................................. 707/394, 737
See application file for complete search history.

(56) References Cited

U.S. PATENT DOCUMENTS

| | | | |
|---|---|---|---|
| 6,182,028 B1 | 1/2001 | Karaali | |
| 6,182,058 B1 | 1/2001 | Kohavi | |
| 6,405,162 B1 | 6/2002 | Segond | |
| 6,785,672 B1 | 8/2004 | Floratos | |
| 6,947,918 B2 | 9/2005 | Brill | |
| 7,739,261 B2 | 6/2010 | Zeng | |
| 8,635,197 B2 * | 1/2014 | Chaturvedi | G06F 17/00 707/602 |
| 8,852,000 B1 * | 10/2014 | Rhinesmith et al. | 463/42 |
| 8,949,237 B2 * | 2/2015 | Balcan | G06F 17/30867 707/737 |
| 2005/0022106 A1 * | 1/2005 | Kawai et al. | 715/500 |
| 2005/0060721 A1 * | 3/2005 | Choudhary et al. | 719/318 |
| 2005/0149436 A1 * | 7/2005 | Elterich | 705/39 |
| 2008/0235204 A1 | 9/2008 | Dai | |
| 2010/0250537 A1 | 9/2010 | Van De Par | |
| 2012/0054220 A1 * | 3/2012 | Zhang et al. | 707/769 |
| 2012/0185458 A1 * | 7/2012 | Liu | G06F 17/30241 707/709 |
| 2012/0221508 A1 * | 8/2012 | Chaturvedi et al. | 707/602 |

* cited by examiner

*Primary Examiner* — Cheyne D Ly
(74) *Attorney, Agent, or Firm* — Bryan Cave LLP

(57) ABSTRACT

Systems and methods are disclosed herein for performing classification of documents or performing other tasks based on rules. The rules may include context rules that define a mapping that relates a value and context in a document to an attribute to which the value corresponds. Products are selected for labeling with attributes by identifying patterns, e.g. values and contexts that are not covered by a current rule set. Those products having a highest score are selected for labeling in a crowd sourcing forum, where the score is based on the number of non-covered patterns and a frequency of occurrence of the non-covered patterns in a document corpus. Proposed rules are generated for frequently occurring patterns and submitted to analysts for one or both of completion and validation. Proposed rules may include a proposed attribute for a frequently occurring value and corresponding context.

34 Claims, 7 Drawing Sheets

AUTOMATED ATTRIBUTE DISAMBIGUATION WITH HUMAN INPUT

BACKGROUND

1. Field of the Invention

This invention relates to systems and methods for classification of large amounts of documents and other data.

2. Background of the Invention

Many attempts have been made to automatically classify documents or otherwise identify the subject matter of a document. In particular, search engines seek to identify documents that are relevant to the terms of a search query based on determinations of the subject matter of the identified documents. Another area in which classification of documents is important is in the area of product-related documents such as product descriptions, product reviews, or other product-related content. The number of products available for sale constantly increases and the number of documents relating to a particular product is further augmented by social media posts relating to products and other content.

Although some automatic classification methods are quite accurate, they are not a substitute for human judgment. Often documents identified or classified using automated methods are completely irrelevant. In addition, these methods are subject to manipulation by "spammers" who manipulate the word usage of content to obtain a desired classification but provide no useful content.

Of course, with such a large volume of content, human classification of documents is not practical. The systems and methods described herein provide improved methods for incorporating both automated classification and human judgment in a highly effective manner.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
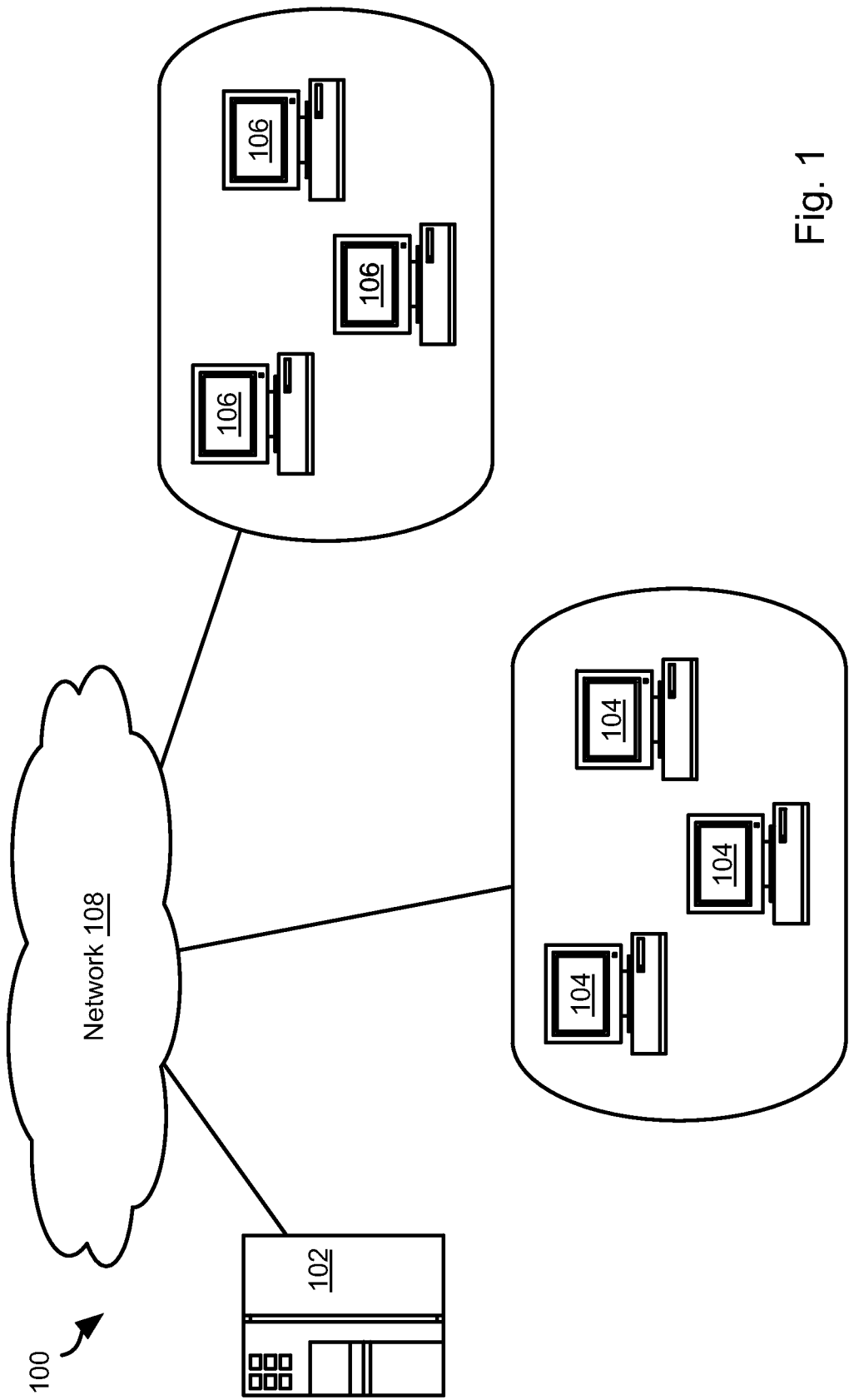
FIG. 1 is a schematic block diagram of a system for performing methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more analyst workstations 104 and one or more crowdsourcing workstations 106. In the methods disclosed herein, the analyst workstations 104 and crowdsourcing workstations 106 may be embodied as mobile devices such as a mobile phone or tablet computer.

In some embodiments, some or all of the methods disclosed herein may be performed using a desktop computer or any other computing device as the analyst computers 104 or crowdsourcing workstations 106. For purposes of this disclosure, discussion of communication with a user or entity or activity performed by the user or entity may be interpreted as communication with a computer 104, 106 associated with the user or entity or activity taking place on a computer associated with the user or entity.

Some or all of the server 102, analyst computers 104, and crowdsourcing workstations 106 may communicate with one another by means of a network 108. The network 108 may be embodied as a peer-to-peer connection between devices, a connection through a local area network (LAN), WiFi network, the Internet, or any other communication medium or system.

The server system 102 may be associated with a merchant, or other entity, providing classification services of documents. For example, the server system 102 may host a search engine or a site hosted by a merchant to provide access to information about products and user opinions about products.

The server system 102 may additionally or alternatively implement a social networking site that enables the generation of content by a user. For example, the server system 102 may store, provide access to, or enable generation of, social media content for a site such as Facebook™, Twitter™, FourSquare™, LinedIn™, or other social networking or blogging site that enables the posting of content by users.

Figure 2:
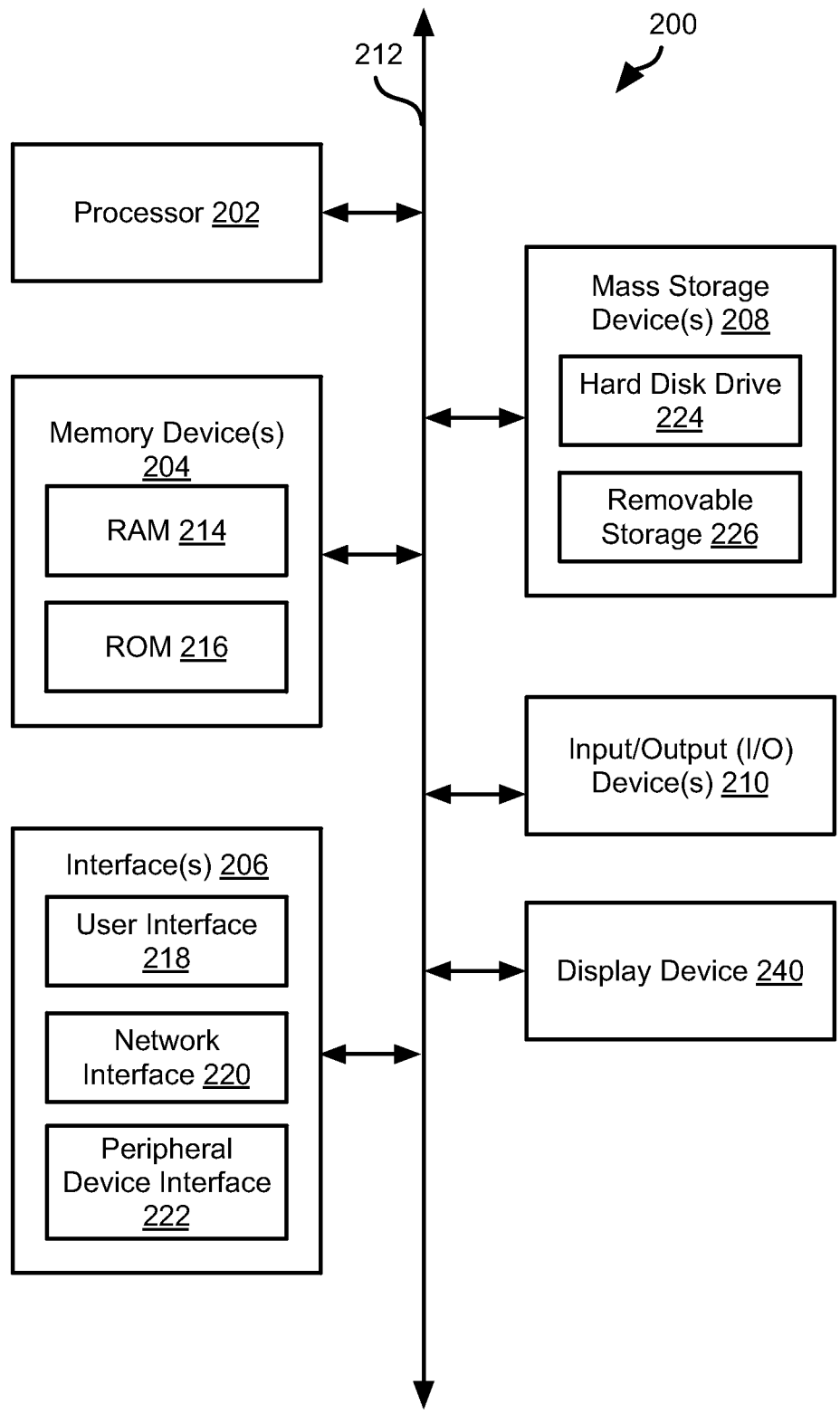
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102a, 102b, user computer 104a, 104b, and crowdsourcing workstation 106a, 106b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
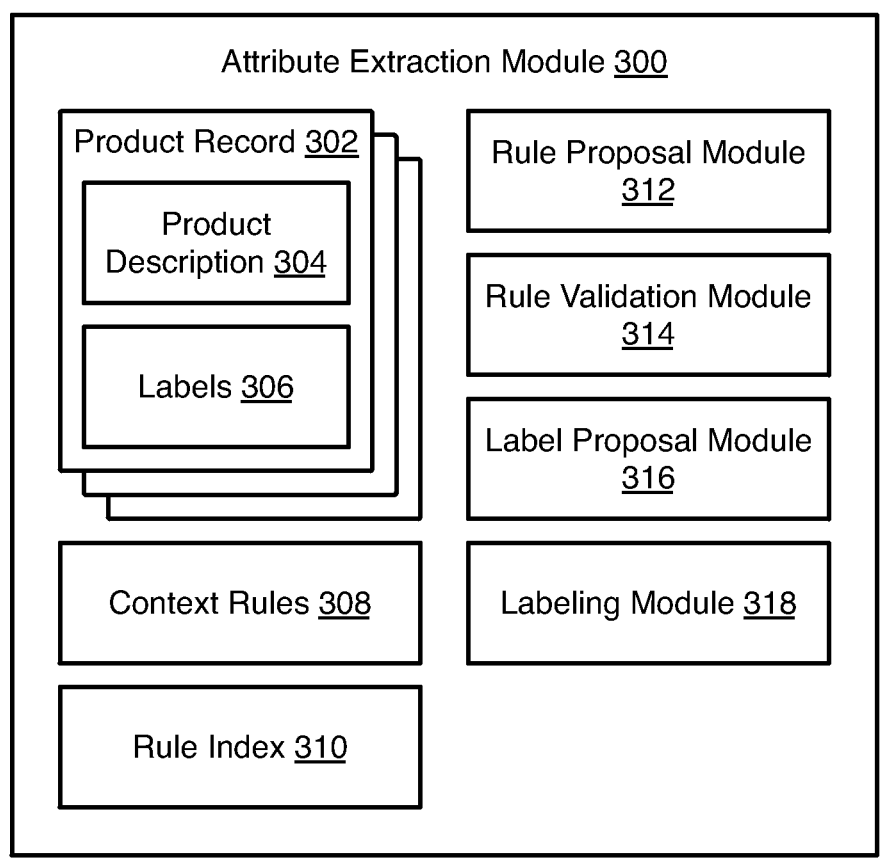
FIG. 3 is a schematic block diagram of an attribute extraction module in accordance with an embodiment of the present invention.

FIG. 3 illustrates an attribute extraction module 300 that may be hosted by a server system 102 or accessed by the server system 102. The attribute extraction module 300 may host or access data that is generated or used in accordance with methods disclosed herein. For example, the attribute extraction module 300 may store or access a plurality of product records 302. The product records 302 may be an official description of a product that is stored or generated by a retailer or manufacturer of a product. The product record 302 may also be user or expert generated content with respect to a product such as a review, comment, or how-to about a product. Although the methods disclosed herein are particularly advantageously used with product records 302, any document relating to any subject matter may be labeled according to the methods disclosed herein.

A product record 302 may include a product description 304 or other content relating to a product and any labels 306 that have been applied to the product record, either by an author of the product description or in accordance with the methods disclosed herein. A label 306 may be of the form [attribute]→[value]. For example, a label 306 may be color→blue, picture quality→clear, sound quality→clear, screen size diagonal→50 inches, or some other label that can be applied to a product record.

The attribute extraction module 300 may additionally host or access context rules 308 that relate patterns found in a product description 304 to one or both of an attribute and a value for an attribute. A context rule may be of the form [pattern]→[attribute]. A context rule may also be of the form [[value], [pattern]]→[attribute], indicating that where [value] occurs in the context defined by [pattern], then the value should be interpreted as corresponding to [attribute]. The [pattern] field may be populated with any description of a textual pattern, such as a regular expression, list of words, or the like. In some embodiments, a word or regular expression description of a word may also indicate a part of speech (e.g., noun, verb, adjective, adverb) that the word should perform in the context in which it is found. For example, a rule may be expressed as ["clear", "produce" (verb) "eye-catching" (adjective)]→"video quality." That is, where the word "clear" occurs in context (e.g. the same sentence or other proximity) with "produce," functioning as a verb and "eye-catching" functioning as an adjective, the word "clear" can be deemed to be a value corresponding to the attribute "video quality." As known in the art, natural language processing (NLP) may be used to infer a part of speech of a word from the context in which the words is found. The [pattern] field may further indicate an ordering, separation, or other co-occurrence attribute for two or more words.

The methods disclosed herein are advantageously used to process a massive number of documents and may require the use of a massive number of context rules. In order to facilitate the application of these rules, a rule index 310 may be used to identify rules applicable to a document. The rule index 310 may have any format or indexing schema as known in the art and may include multiple searchable indexes. In one embodiment of the invention, a rule index 310 advantageously be a token index that lists for each known word a rule that includes that word in the [pattern] field thereof. The rule index 310 may additionally include an "arity" index that lists an arity for each rule, where the arity of a rule is the number of words in a pattern or a minimum number of words that can satisfy the pattern specified in the [pattern] field of a rule.

The attribute extraction module 300 may additionally include a rule proposal module 312, a rule validation module 314, a label proposal module 316, and a labeling module 318. The systems and methods disclosed herein advantageously provide an interface for receiving human input in the labeling of product records and the generating of context rules for automated labeling of products. The modules of the attribute extraction module 300 automate this process and make use of human input in a highly effective way.

A rule proposal module 312 analyzes products records 302, such as all product records or those that already have one or more labels 306 associated therewith, and identify patterns in these products records. Identifying patterns may include, for a labeled product record 302, identifying words, strings of words, co-occurrence of two or more words, proximity of co-occurring two or more words, or other patterns. Those product records 302 having labels with a common [attribute] field, or labels with both a common [attribute] and [value] fields may be identified. Likewise, patterns that these product records 302 have in common may be identified. A proposed rule may therefore be of the form [common pattern]→[common attribute] or [[common value], [common context]]→[common attribute]. The [common pattern] field may be any of the patterns described herein above and may a pattern common to two documents may be extracted by any document analysis technique known in the art.

In some embodiments, a rule proposal module may examine one or more product records, extract frequent patterns, and generate proposed rules for the patterns of the form [pattern]→[none], where the attribute or attribute-value pair is supplied later by an analyst.

The rule validation module 314 submits proposed rules to analysts. For example, the rule validation module 314 may host a queue. The analyst computers 104 may host an interface that retrieves one or more proposed rules from the queue and submits a response that includes a rejection or validation of a proposed rule. The response may additionally include a substitution for the output of the rule or input of a rule output where none was supplied with the proposed rule. The rule validation module 314 may then receive validated rules and include the validated rules in the context rules 308 as well as make appropriate entries for the validated rule in the rule index 310. Those patterns that are submitted to the analysts for validation or completion may be selected in a manner to reduce the amount of human input required. A method for selecting patterns for submission to analysts is described in greater detail hereinbelow.

A label proposal module 316 selects product records 302 for labeling. A method for selecting product records 302 in an effective manner is described in greater detail below. The labeling module 318 submits the selected product records 302 to the crowd sourcing computers 106, which may be operated by members of a crowdsourcing community or forum. In some embodiments the labeling module 318 submits requests for labeling to a crowdsourcing system that then distributes these requests to members of the crowdsourcing community, receives responses, and returns these responses to the labeling module 318. The responses may be in the form of labels (e.g., [attribute] or [attribute]→[value] pairs) that are then associated with the corresponding product record 302.

Figure 4:
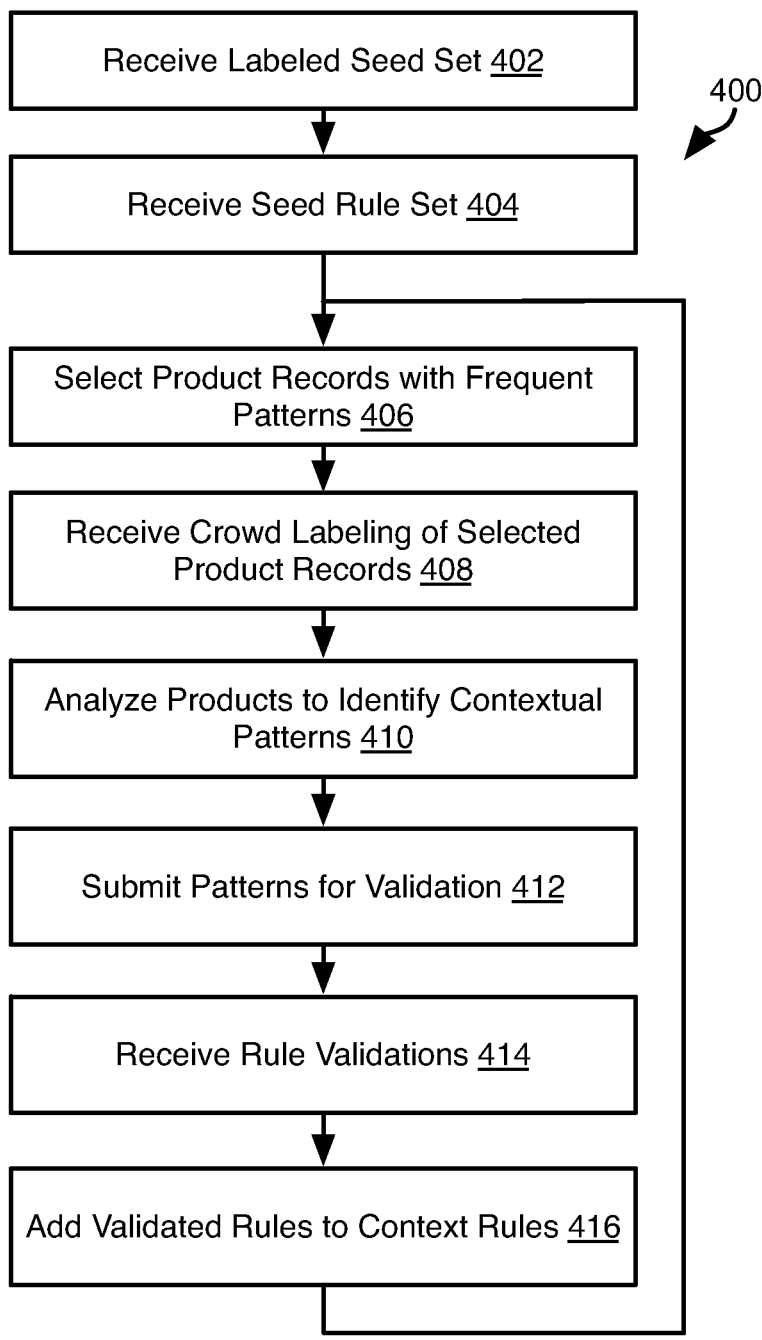
FIG. 4 is a process flow diagram of a method for labeling documents in accordance with an embodiment of the present invention.

FIG. 4 illustrates a method 400 that may be executed to both label products and establish contextual rules for labeling products. The method 400 may be executed by a server system 102 or by another entity with an interface provided to the server system 102. The method 400 may include receiving 402 a labeled seed set of product records and receiving 404 a seed set of context rules. As will become apparent from discussion of the methods below, a seed set of rules or labeled products is not required. However, where these exist they may facilitate the generation of other labeled product records and context rules.

The method 400 may further include selecting 406 product records for labeling. The product records selected for labeling may be those for which labeling will be applicable to as many other product records as possible. For example, those product records selected may be those that include the largest number of patterns that are not already covered by rules and the non-covered patterns used with the highest frequency. A method for selecting product records for labeling is described in greater detail with respect to FIG. 5. The selected product records are submitted to a crowdsourcing forum for labeling and labels for the selected product records are received 408 and stored with the associated product record.

The method 400 may further include analyzing one or both of labeled and unlabeled product records to identify 410 contextual patterns. For example, among those products that have been labeled, the top M patterns that occur with the highest frequency and are not already associated with a context rule may be identified 410 as good candidates for contextual rules. A pattern may include a value and a context for the value.

The identified 410 patterns may then be submitted 412 to analysts for validation and/or completion. This may include transmitting the patterns to the analyst computers 104 and receiving 414 validated rules or rejected rules. The received rules may then be added 416 to a set of validated context rules. A validated rule may include a pattern, such as a value and a corresponding context for the value, and an attribute with which the value should be labeled. A rejected rule may indicate that a pattern is not descriptive and does not indicate an attribute or value. Rejected rules may be stored such that patterns associated with rejected rules are not repeatedly the subject of requests for context rules. A more detailed method for proposing context rules and receiving validated rules is described in greater detail with respect to FIG. 6. Some or all of the steps 406-416 may be repeated in an iterative fashion until a product taxonomy or other corpus has been labeled completely or substantially completely or until a corpus of context of rules has been generated that can classify products with an adequate level of precision and recall.

Figure 5:
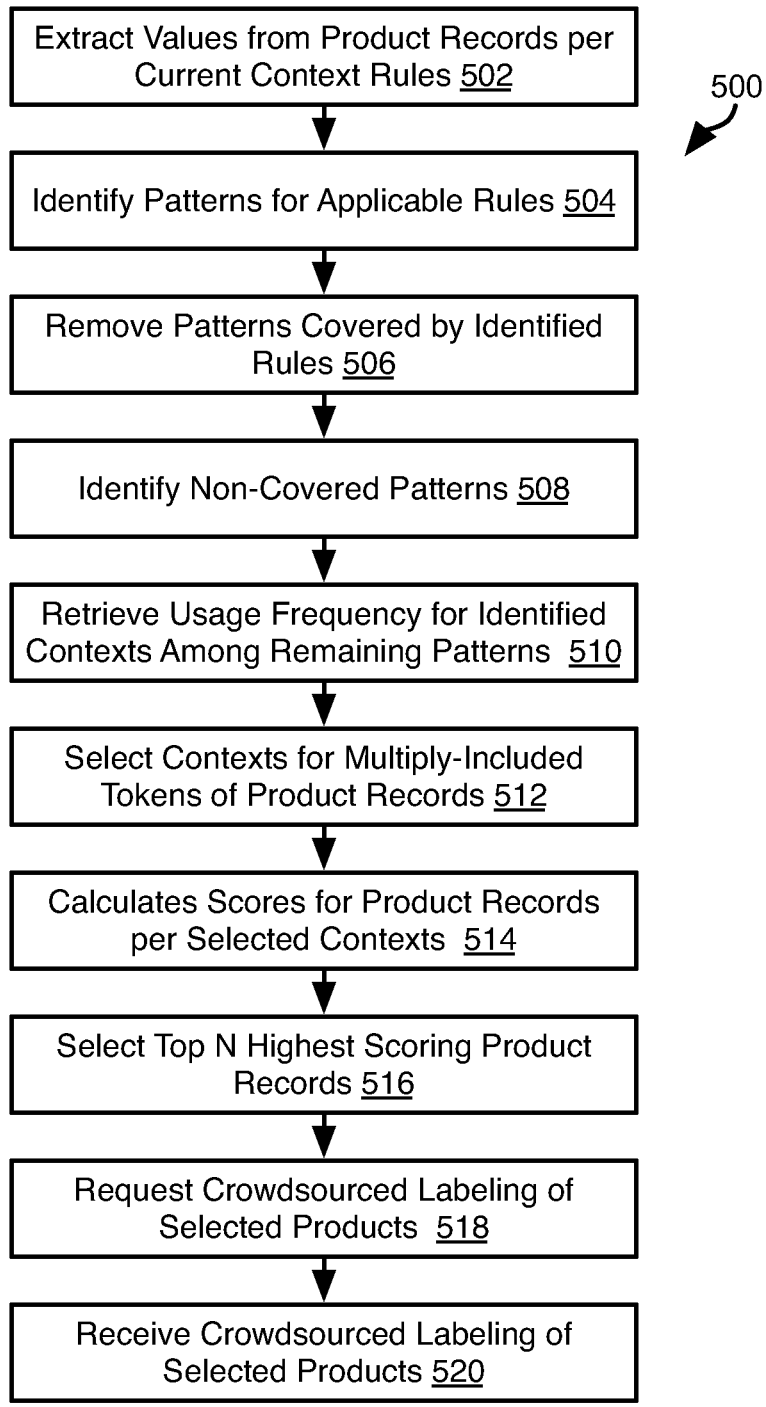
FIG. 5 is a process flow diagram of a method for selecting documents for labeling in accordance with an embodiment of the present invention.

FIG. 5 illustrates a method 500 that may be used to select product records for labeling. The method 500 may be executed by a server system 102 or by some other entity with an interface provided to the server system 102. The method 500 may use a list of patterns for a corpus of documents. The list may include all patterns or only those patterns that are included in a threshold number K of records, such as those patterns included in K=10, product records. The list may include as entries a pattern and a usage frequency corresponding to a number of inclusions of that pattern in product records. The patterns of the index may be value-context pairs or a context that does not necessarily include a value. The usage frequency for the pattern may be a function of the number of product records that include the pattern or the total number of times the pattern occurs, such that each occurrence is counted even though there are multiple occurrences in the same document.

The method 500 may include extracting 502 values from product records. A value may simply be a word for which the sense of the word needs to be found. A value may be restricted to a value that could potentially be an attribute of a product or other entity. For example, values may be those words that according to NLP appear to be used as adjectives, adverbs, or other descriptors of a product, its qualities, usage, or capabilities. The values may be extracted 502 from all product records or less than all product records, such as from product records that have not been manually labeled by crowdsourcing or as part of a seed set or automatically labeled according to context rules.

Extracting 502 values may include extracting those values for which a rule applies. For example, a current rule set may be applied to the product records, and patterns for applicable rules (e.g. a [[value],[context]]→[attribute]) may identified 504. The identified [context] fields of applicable rules may be compared to the product records, or an unlabeled subset thereof, and text covered by the pattern's [context] and [value] fields may be removed 506, leaving only those patterns to which no validated rule applies.

The method 500 may further include identifying 508 non-covered values and their corresponding context. Context may include N words on either side of a value, words in a sentence or sentence including a value, or a paragraph in which the value is found. Context for a value may also include global context for a product record in which the value was found, such as the top L most used words in the document or concepts associated with the document according to analysis thereof, such as using the concept extraction techniques described in U.S. patent application Ser. No. 13/300,524, entitled "PROCESSING DATA FEEDS," filed Nov. 18, 2011, which is hereby incorporated herein by reference in its entirety for all purposes. The context for a value may include any property or content of the product record in which the value was found or property, content, or characterization of a product record that may be of use in performing any technique of concept extraction, word sense disambiguation, or other textual analysis known in the art. The context may include any of the pattern types or pattern representations listed hereinabove. The definition of a context may be extracted regardless of known significance inasmuch as in subsequent steps will validate whether the context is indicative of an attribute.

The method 500 may further include retrieving 510 the usage frequencies for the identified patterns, such as value and context combinations. The usage frequency may be measured among all documents of a corpus, such as all product records in a product taxonomy processed according to the methods disclosed herein. For example the usage frequency may be retrieved for the identified contexts from a precompiled list of patterns and corresponding usage frequencies mentioned above.

It is possible that a token (e.g. instance of a word, acronym, number or other combination of characters) may be included in multiple identified patterns. In some embodiments, only the usage frequency for one of the patterns including such a token will be used. Accordingly, for a token, the usage frequencies of the identified 508 patterns including the token may be evaluated, and the pattern having the highest usage frequency may be selected 512 for that token and other patterns removed from consideration. Where a token is only included in one pattern, this pattern will be the selected 512 pattern for that token.

For each product record including a non-covered patterns, e.g. values and corresponding contexts, the usage frequencies for selected 512 patterns may be summed in order to calculate 514 a score for that product record.

The N product records with the highest scores may then be selected 516 for soliciting crowdsourced labeling. The value of N may be a function of capacity. For example, the value of N may be chosen to be equal to the number of crowdsourcing individuals available according to budget constraints to perform labeling or some multiple thereof. Labeling of the selected 516 product records may then be requested 518 from a crowdsourcing community and labels for the selected 516 product records may be received 520 from the crowdsourcing forum. The received 520 labels for a product record may then be stored in association with the product record. The labels received for a product record may include attribute and value pairs identified for the product record by a member of a crowdsourcing forum.

The method 500 advantageously ensures that those product records are selected for labeling that will contribute the most to the establishment of context rules applicable to other product records. This ensures that the human input, which takes longer and is more expensive than computation, is used effectively.

Figure 6:
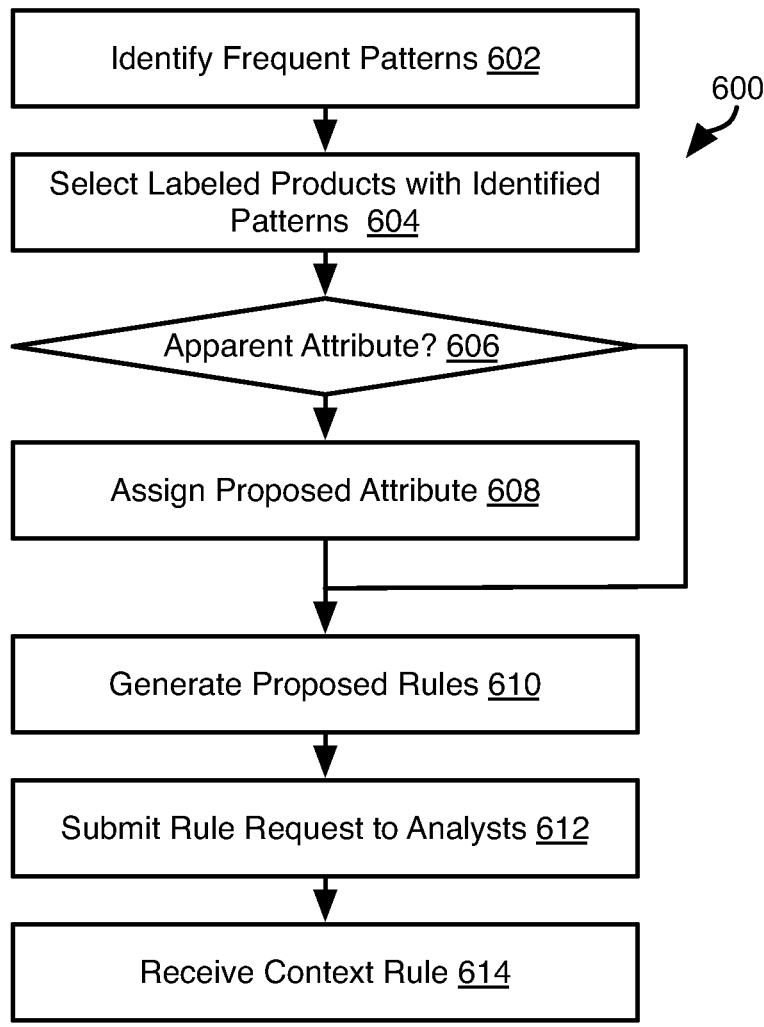
FIG. 6 is a process flow diagram of a method for generating proposed contextual rule in accordance with an embodiment of the present invention.

FIG. 6 illustrates a method 600 that may be used to generate proposed context rules and obtain validation of context rules. The method 600 may be executed by the server system 102 or executed elsewhere with an interface provided to the server system 102.

The method 600 may include identifying 602 frequent patterns among the product records. The identified 602 frequent patterns may be those that are not covered by a validated context rule. In some embodiments, a corpus of products may be analyzed to identify patterns and list of patterns sorted by frequency may be generated. As context rules are generated for a pattern or the pattern is rejected as not descriptive according to methods disclosure herein, the pattern may be removed from the list. Accordingly, for each iteration of the method 602, the top M patterns may be identified 602 as frequent patterns and removed from the list. Identifying 602 frequent patterns may include identifying values and corresponding contexts among the product records that are not currently covered by a validated context rule.

In some embodiments, a proposed attribute may be assigned to a value and corresponding context. The proposed attribute may be selected according to any word sense disambiguation or concept extraction technique known in the art. A word sense disambiguation technique may be employed using as an input some or all product records that include a particular frequent pattern, such as a value and context combination.

In some embodiments, those products that include a label may be analyzed with respect to frequently occurring patterns in order to identify a proposed attribute for a pattern including a value and context. For example, if, among the labeled product records, all, or a significant percentage (e.g. over 50% or over 95%), of products including a common value and common context for that value also have been assigned the same attribute for that value, then this attribute may be selected as a proposed attribute for that value and context.

In another example, if, among the labeled product records, a threshold number or percentage of products including a common value and common context for that value also have been assigned the same attribute for that value and no significant number (e.g., 0% or less than 1%) of labeled product records not including the common value and common context have been assigned the same attribute and value, then this attribute may be selected as a proposed attribute for that value and context.

Accordingly, the method 600 may include selecting 604 labeled products including an identified frequently used pattern and evaluating 606 whether the labeled products indicate that an apparent attribute should be assigned to the value of the attribute context pair of the pattern. This may include evaluating the labeled products as described in the preceding paragraphs or according to any other method of statistical analysis to identify correspondence between the occurrence of a value and context and the labeling of a product record with an attribute for the value. If an apparent attribute is found 606 for a value and context of a pattern, this attribute may be assigned 608 to that pattern for use in a proposed rule.

Proposed rules may then be generated 610. If an apparent attribute has been assigned to a pattern, the proposed rule may be of the form [[value],[context]]→[apparent attribute]. Where an identified 602 frequent pattern has not been found to have a corresponding apparent attribute a proposed rule may be of the form [[value],[context]]→[none], with the attribute field left blank. In some embodiments a proposed rule may indicate the frequency of occurrence of a value and context of a pattern in the document corpus being analyzed, such as among the product records of a product taxonomy or catalog. For example a proposed rule may be of the form [[value],[context],[frequency]]→[none] or [[value],[context],[frequency]]→[apparent attribute]. Proposed rules may be generated 610 for frequently occurring patterns that occur in one or both of labeled and unlabeled product records.

The generated proposed rules 610 may be submitted 612 to an analyst, such as by transmitting the proposed rules to an analyst computer 104. A response may be received 614 from the analyst computer. Where a proposed rule includes an apparent attribute, a response may be a validation of the apparent attribute or include a replacement attribute. A response to a proposed rule that includes no attribute may include an attribute supplied by the analyst. In some embodiments, a response to a proposed rule may indicate rejection of the proposed rule, i.e., that the pattern of the proposed rule, e.g. a value and context, is not indicative of an attribute or is too generic to infer an attribute.

In either case, a validated rule may be added to the context rules. Where a response is a rejection of the proposed rule this fact may also be added to the context rules in order to avoid re-evaluating the pattern of the proposed rule in subsequent iterations.

Figure 7:
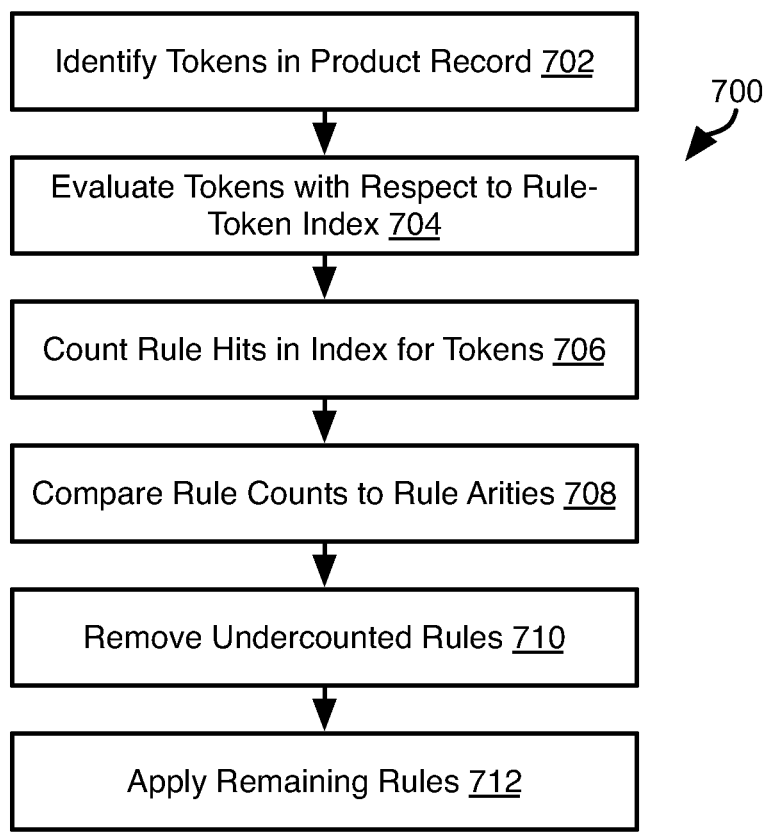
FIG. 7 is a process flow diagram of a method for applying contextual rules to a document in accordance with an embodiment of the present invention.

FIG. 7 illustrates an example method 700 that may be used to select the context rules with respect to which a product record is to be evaluated. The method 700 may be executed by a server system 102 or by another entity with an interface provided to the server system 102. The method 700 may be executed in the context of the methods described herein above to identify the rules applicable to a product record, such as for the method 500. The method 700 may also be used in response to queries or requests to classify a product record, i.e., find out the attributes and corresponding values of a product record for which such data is not known.

The method 700 may include identifying 702 tokens in a product record and evaluating 704 these tokens with respect to a rule-word index. As noted above, the rule-word index includes for each rule a list of words that are required to satisfy the pattern, e.g. the words of a context or value specified for a rule. For each rule, the number of hits found in the rule-word index for the tokens of the product record is counted 706. The count for each rule is compared 708 to an arity for the rule. The "arity" of a rule is the number of words required to satisfy the rule. Where the hit count for a rule is not greater than or equal to the arity for the rule, then it is not possible for this rule to apply to the product record. Accordingly, these undercounted rules may be removed 710 from consideration. Those other rules for which the hit count was greater than or equal to the arity of the rule may then be applied 712 to the product record. Applying 712 a rule may include searching the product record for the value and context specified in the rule. If this is found, then the rule is satisfied and the product record can be labeled with the attribute specified in the rule. This attribute may be stored with the record for use in accordance with the methods described herein or in output to a display device or to a requesting function or module for use elsewhere. For example, once some or all of the values identified in a product record have been assigned attributes, the product record may be used to respond to search queries for information about the product. The attribute-value combinations with which a product is labeled may be used to identify references to a product based on attribute mentions in documents that do not explicitly identify the product associated with a product record, such as described in U.S. application Ser. No. 13/688,060 filed Nov. 28, 2012 and entitled IDENTIFYING PRODUCT REFERENCES IN USER-GENERATED CONTENT, which is hereby incorporated herein by reference in its entirety.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for labeling, the method comprising:
   identifying, by a computer system comprising one or more processors, a plurality of patterns in a plurality of documents, the plurality of patterns not covered by a set of validated contextual rules;
   (a) selecting, by the computer system, a batch of documents of the plurality of documents according to a frequency of usage of patterns included in the batch of documents of the plurality of documents, where the frequency of usage is for the plurality of documents, the batch of documents of the plurality of documents is selected by, for each document of the plurality of documents:
      identifying a pattern set for the each document;
      removing from the pattern set those patterns for which a rule of the set of validated contextual rules applies; and
      computing a score for the each document according to a sum of usage frequencies for the patterns of the pattern set for the plurality of documents;
   (b) submitting, by the computer system, the batch of documents of the plurality of documents to a crowdsourcing community for labeling;
   (c) receiving, by the computer system, labels for the batch of documents of the plurality of documents;
   (d) generating, by the computer system, proposed contextual rules based on labeled documents of the plurality of documents;
   (e) submitting, by the computer system, the proposed contextual rules to an analyst community for validation;
   (f) receiving, by the computer system, validation of a portion of the proposed contextual rules; and
   (g) adding the portion validated of the proposed contextual rules to the set of validated contextual rules.

2. The method of claim 1, further comprising, repeating steps (a) through (g) repeatedly.

3. The method of claim 1, wherein generating, by the computer system, the proposed contextual rules based on the labeled documents of the plurality of documents comprises:
   identifying one or more patterns in the labeled documents and a usage frequency for the one or more patterns identified;
   selecting a top N patterns of the one or more patterns having highest usage frequencies;
   if a label of the labeled documents has a high correspondence to a pattern of the top N patterns of the one or more patterns, generating a proposed contextual rule relating the pattern of the top N patterns of the one or more patterns to the label; and
   otherwise, generating a proposed contextual rule that includes the pattern of the top N patterns of the one or more patterns but no related label.

4. The method of claim 1, further comprising applying the set of validated contextual rules to a document of the plurality of documents in order to determine labels thereof.

5. The method of claim 1, further comprising applying the set of validated contextual rules to the plurality of documents by, for a current document of the plurality of documents:
   identifying one or more tokens in the current document;
   searching for the one or more tokens identified in an index relating words to rules;
   counting a number of hits for each applicable rule of applicable rules having a corresponding token in the one or more tokens identified;
   comparing the number of hits for the each applicable rule of the applicable rules; and
   labeling the current document according to those applicable rules having a pattern word count greater than or equal to the number of hits for the each applicable rule of the applicable rules.

6. The method of claim 1, wherein the set of validated contextual rules (a) take as inputs a value and a value context and (b) output an attribute label for the value.

7. The method of claim 6, wherein the value context includes words adjacent the value.

8. The method of claim 7, wherein the value context includes a part of speech for the words adjacent the value.

9. The method of claim 1, wherein the plurality of documents are product descriptions in a product taxonomy.

10. A system for labeling, the system comprising one or more processors and one or more memory devices operably coupled to the one or more processors, the one or more memory devices storing executable and operational data effective to cause the one or more processors to:
    identify a plurality of patterns in a plurality of documents, the plurality of patterns not covered by a set of validated contextual rules;
    (a) select a batch of documents of the plurality of documents according to a frequency of usage of patterns included in the batch of documents of the plurality of documents, where the frequency of usage is for the plurality of documents, the batch of documents of the plurality of documents is selected by, for each document of the plurality of documents:
  identifying a pattern set for the each document;
  removing from the pattern set those patterns for which a rule of the set of validated contextual rules applies; and
  computing a score for the each document according to a sum of usage frequencies for the patterns of the pattern set for the plurality of documents;
(b) submit the batch of documents of the plurality of documents to a crowdsourcing community for labeling;
(c) receive labels for the batch of documents of the plurality of documents;
(d) generate proposed contextual rules based on labeled documents of the plurality of documents;
(e) submit the proposed contextual rules to an analyst community for validation;
(f) receive validation of a portion of the proposed contextual rules; and
(g) add the portion validated of the proposed contextual rules to the set of validated contextual rules.

11. The system of claim 10, wherein the executable and operational data are further effective to cause the one or more processors to repeat steps (a) through (g) repeatedly.

12. The system of claim 10, wherein the executable and operational data are further effective to cause the one or more processors to generate the proposed contextual rules based on the labeled documents of the plurality of documents by:
  identifying one or more patterns in the labeled documents and a usage frequency for the one or more patterns identified;
  selecting a top N patterns of the one or more patterns having highest usage frequencies;
  if a label of the labeled documents has a high correspondence to a pattern of the top N patterns of the one or more patterns, generating a proposed contextual rule relating the pattern of the top N patterns of the one or more patterns to the label; and
  otherwise, generating a proposed contextual rule that includes the pattern of the top N patterns of the one or more patterns but no related label.

13. The system of claim 10, wherein the executable and operational data are further effective to cause the one or more processors to apply the set of validated contextual rules to a document of the plurality of documents in order to determine labels thereof.

14. The system of claim 10, wherein the executable and operational data are further effective to cause the one or more processors to apply the set of validated contextual rules to the plurality of documents by, for a current document of the plurality of documents:
  identifying one or more tokens in the current document;
  searching for the one or more tokens identified in an index relating words to rules;
  counting a number of hits for each applicable rule of applicable rules having a corresponding token in the one or more tokens identified;
  comparing the number of hits for the each applicable rule of the applicable rules; and
  labeling the current document according to those applicable rules having a pattern word count greater than or equal to the number of hits for the each applicable rule of the applicable rules.

15. The system of claim 10, wherein the set of validated contextual rules (a) take as inputs a value and a value context and (b) output an attribute label for the value.

16. The system of claim 15, wherein the value context includes a part of speech for the words adjacent the value.

17. A system for labeling, the system comprising one or more processors and one or more memory devices operably coupled to the one or more processors, the one or more memory devices storing executable and operational data effective to cause the one or more processors to:
  identify a plurality of patterns in a plurality of documents, the plurality of patterns not covered by a set of validated contextual rules;
(a) select a batch of documents of the plurality of documents according to a frequency of usage of patterns included in the batch of documents of the plurality of documents, where the frequency of usage is for the plurality of documents, the batch of documents of the plurality of documents is selected by, for each document of the plurality of documents:
  identifying a pattern set for the each document;
  removing from the pattern set those patterns for which a rule of the set of validated contextual rules applies;
  obtaining usage frequencies for remaining patterns of the pattern set;
  for each token of one or more tokens of the each document, identifying patterns of the pattern set including the each token, and selecting a selected pattern of the patterns identified having a highest usage frequency; and
  computing a score for the each document according to the usage frequencies of the selected patterns;
(b) submit the batch of documents of the plurality of documents to a crowdsourcing community for labeling;
(c) receive labels for the batch of documents of the plurality of documents;
(d) generate proposed contextual rules based on labeled documents of the plurality of documents;
(e) submit the proposed contextual rules to an analyst community for validation;
(f) receive validation of a portion of the proposed contextual rules; and
(g) add the portion validated of the proposed contextual rules to the set of validated contextual rules.

18. The system of claim 17, wherein the executable and operational data are further effective to cause the one or more processors to generate the proposed contextual rules based on the labeled documents of the plurality of documents by:
  identifying one or more patterns in the labeled documents and a usage frequency for the one or more patterns identified;
  selecting a top N patterns of the one or more patterns having highest usage frequencies;
  if a label of the labeled documents has a high correspondence to a pattern of the top N patterns of the one or more patterns, generating a proposed contextual rule relating the pattern of the top N patterns of the one or more patterns to the label; and
  otherwise, generating a proposed contextual rule that includes the pattern of the top N patterns of the one or more patterns but no related label.

19. The system of claim 17, wherein the executable and operational data are further effective to cause the one or more processors to apply the set of validated contextual rules to the plurality of documents by, for a current document of the plurality of documents:
  identifying the one or more tokens in the current document;
  searching for the one or more tokens identified in an index relating words to rules;

counting a number of hits for each applicable rule of applicable rules having a corresponding token in the one or more tokens identified;
comparing the number of hits for the each applicable rule of the applicable rules; and
labeling the current document according to those applicable rules having a pattern word count greater than or equal to the number of hits for the each applicable rule of the applicable rules.

20. A system for labeling, the system comprising one or more processors and one or more memory devices operably coupled to the one or more processors, the one or more memory devices storing executable and operational data effective to cause the one or more processors to:
identify a plurality of patterns in a plurality of documents, the plurality of patterns not covered by a set of validated contextual rules;
(a) select a batch of documents of the plurality of documents according to a frequency of usage of patterns included in the batch of documents of the plurality of documents, where the frequency of usage is for the plurality of documents;
(b) submit the batch of documents of the plurality of documents to a crowdsourcing community for labeling;
(c) receive labels for the batch of documents of the plurality of documents;
(d) generate proposed contextual rules based on labeled documents of the plurality of documents by:
identifying one or more patterns in the labeled documents and a usage frequency for the one or more patterns identified;
selecting a top N patterns of the one or more patterns having highest usage frequencies;
if a label of the labeled documents has a high correspondence to a pattern of the top N patterns of the one or more patterns, generating a proposed contextual rule relating the pattern of the top N patterns of the one or more patterns to the label; and
otherwise, generating a proposed contextual rule that includes the pattern of the top N patterns of the one or more patterns but no related label;
(e) submit the proposed contextual rules to an analyst community for validation;
(f) receive validation of a portion of the proposed contextual rules; and
(g) add the portion validated of the proposed contextual rules to the set of validated contextual rules.

21. The system of claim 20, wherein the executable and operational data are further effective to cause the one or more processors to apply the set of validated contextual rules to a document of the plurality of documents in order to determine labels thereof.

22. The system of claim 20, wherein the executable and operational data are further effective to cause the one or more processors to apply the set of validated contextual rules to the plurality of documents by, for a current document of the plurality of documents:
identifying one or more tokens in the current document;
searching for the one or more tokens identified in an index relating words to rules;
counting a number of hits for each applicable rule of applicable rules having a corresponding token in the one or more tokens identified;
comparing the number of hits for the each applicable rule of the applicable rules; and
labeling the current document according to those applicable rules having a pattern word count greater than or equal to the number of hits for the each applicable rule of the applicable rules.

23. A system for labeling, the system comprising one or more processors and one or more memory devices operably coupled to the one or more processors, the one or more memory devices storing executable and operational data effective to cause the one or more processors to:
identify a plurality of patterns in a plurality of documents, the plurality of patterns not covered by a set of validated contextual rules;
(a) select a batch of documents of the plurality of documents according to a frequency of usage of patterns included in the batch of documents of the plurality of documents, where the frequency of usage is for the plurality of documents;
(b) submit the batch of documents of the plurality of documents to a crowdsourcing community for labeling;
(c) receive labels for the batch of documents of the plurality of documents;
(d) generate proposed contextual rules based on labeled documents of the plurality of documents;
(e) submit the proposed contextual rules to an analyst community for validation;
(f) receive validation of a portion of the proposed contextual rules;
(g) add the portion validated of the proposed contextual rules to the set of validated contextual rules; and
apply the set of validated contextual rules to the plurality of documents by, for a current document of the plurality of documents:
identifying one or more tokens in the current document;
searching for the one or more tokens identified in an index relating words to rules;
counting a number of hits for each applicable rule of applicable rules having a corresponding token in the one or more tokens identified;
comparing the number of hits for the each applicable rule of the applicable rules; and
labeling the current document according to those applicable rules having a pattern word count greater than or equal to the number of hits for the each applicable rule of the applicable rules.

24. The system of claim 23, wherein the executable and operational data are further effective to cause the one or more processors to apply the set of validated contextual rules to a document of the plurality of documents in order to determine labels thereof.

25. The system of claim 23, wherein the set of validated contextual rules (a) take as inputs a value and a value context and (b) output an attribute label for the value.

26. A method for labeling, the method comprising:
identifying, by a computer system comprising one or more processors, a plurality of patterns in a plurality of documents, the plurality of patterns not covered by a set of validated contextual rules;
(a) selecting, by the computer system, a batch of documents of the plurality of documents according to a frequency of usage of patterns included in the batch of documents of the plurality of documents, where the frequency of usage is for the plurality of documents, the batch of documents of the plurality of documents is selected by, for each document of the plurality of documents:

identifying a pattern set for the each document;
removing from the pattern set those patterns for which a rule of the set of validated contextual rules applies;
obtaining usage frequencies for remaining patterns of the pattern set;
for each token of one or more tokens of the each document, identifying patterns of the pattern set including the each token, and selecting a selected pattern of the patterns identified having a highest usage frequency; and
computing a score for the each document according to the usage frequencies of the selected patterns;
(b) submitting, by the computer system, the batch of documents of the plurality of documents to a crowdsourcing community for labeling;
(c) receiving, by the computer system, labels for the batch of documents of the plurality of documents;
(d) generating, by the computer system, proposed contextual rules based on labeled documents of the plurality of documents;
(e) submitting, by the computer system, the proposed contextual rules to an analyst community for validation;
(f) receiving, by the computer system, validation of a portion of the proposed contextual rules; and
(g) adding the portion validated of the proposed contextual rules to the set of validated contextual rules.

27. The method of claim 26, wherein generating, by the computer system, the proposed contextual rules based on the labeled documents of the plurality of documents comprises:
identifying one or more patterns in the labeled documents and a usage frequency for the one or more patterns identified; selecting a top N patterns of the one or more patterns having highest usage frequencies;
if a label of the labeled documents has a high correspondence to a pattern of the top N patterns of the one or more patterns, generating a proposed contextual rule relating the pattern of the top N patterns of the one or more patterns to the label; and
otherwise, generating a proposed contextual rule that includes the pattern of the top N patterns of the one or more patterns but no related label.

28. The method of claim 26, further comprising applying the set of validated contextual rules to the plurality of documents by, for a current document of the plurality of documents:
identifying one or more tokens in the current document;
searching for the one or more tokens identified in an index relating words to rules;
counting a number of hits for each applicable rule of applicable rules having a corresponding token in the identified one or more tokens;
comparing the number of hits for the each applicable rule of the applicable rules; and
labeling the current document according to those applicable rules having a pattern word count greater than or equal to the number of hits for the each applicable rule of the applicable rules.

29. A method for labeling, the method comprising:
identifying, by a computer system comprising one or more processors, a plurality of patterns in a plurality of documents, the plurality of patterns not covered by a set of validated contextual rules;
(a) selecting, by the computer system, a batch of documents of the plurality of documents according to a frequency of usage of patterns included in the batch of documents of the plurality of documents, where the frequency of usage is for the plurality of documents;
(b) submitting, by the computer system, the batch of documents of the plurality of documents to a crowdsourcing community for labeling;
(c) receiving, by the computer system, labels for the batch of documents of the plurality of documents;
(d) generating, by the computer system, proposed contextual rules based on labeled documents of the plurality of documents by:
identifying one or more patterns in the labeled documents and a usage frequency for the one or more patterns identified;
selecting a top N patterns of the one or more patterns having highest usage frequencies;
if a label of the labeled documents has a high correspondence to a pattern of the top N patterns of the one or more patterns, generating a proposed contextual rule relating the pattern of the top N patterns of the one or more patterns to the label; and
otherwise, generating a proposed contextual rule that includes the pattern of the top N patterns of the one or more patterns but no related label;
(e) submitting, by the computer system, the proposed contextual rules to an analyst community for validation;
(f) receiving, by the computer system, validation of a portion of the proposed contextual rules; and
(g) adding the portion validated of the proposed contextual rules to the set of validated contextual rules.

30. The method of claim 29, wherein generating, by the computer system, the proposed contextual rules based on the labeled documents of the plurality of documents comprises:
identifying one or more patterns in the labeled documents and a usage frequency for the one or more patterns identified;
selecting a top N patterns of the one or more patterns having highest usage frequencies;
if a label of the labeled documents has a high correspondence to a pattern of the top N patterns of the one or more patterns, generating a proposed contextual rule relating the pattern of the top N patterns of the one or more patterns to the label; and
otherwise, generating a proposed contextual rule that includes the pattern of the top N patterns of the one or more patterns but no related label.

31. The method of claim 29, further comprising applying the set of validated contextual rules to the plurality of documents by, for a current document of the plurality of documents:
identifying one or more tokens in the current document;
searching for the one or more tokens identified in an index relating words to rules;
counting a number of hits for each applicable rule of applicable rules having a corresponding token in the identified one or more tokens;
comparing the number of hits for the each applicable rule of the applicable rules; and
labeling the current document according to those applicable rules having a pattern word count greater than or equal to the number of hits for the each applicable rule of the applicable rules.

32. A method for labeling, the method comprising:
identifying, by a computer system comprising one or more processors, a plurality of patterns in a plurality of documents, the plurality of patterns not covered by a set of validated contextual rules;
(a) selecting, by the computer system, a batch of documents of the plurality of documents according to a frequency of usage of patterns included in the batch of documents of the plurality of documents, where the frequency of usage is for the plurality of documents;

(b) submitting, by the computer system, the batch of documents of the plurality of documents to a crowdsourcing community for labeling;

(c) receiving, by the computer system, labels for the batch of documents of the plurality of documents;

(d) generating, by the computer system, proposed contextual rules based on labeled documents of the plurality of documents;

(e) submitting, by the computer system, the proposed contextual rules to an analyst community for validation;

(f) receiving, by the computer system, validation of a portion of the proposed contextual rules;

(g) adding the portion validated of the proposed contextual rules to the set of validated contextual rules; and applying the set of validated contextual rules to the plurality of documents by, for a current document of the plurality of documents:

identifying one or more tokens in the current document;

searching for the one or more tokens identified in an index relating words to rules;

counting a number of hits for each applicable rule of applicable rules having a corresponding token in the one or more tokens identified;

comparing the number of hits for the each applicable rule of the applicable rules; and labeling the current document according to those applicable rules having a pattern word count greater than or equal to the number of hits for the each applicable rule of the applicable rules.

33. The method of claim 32, further comprising applying the set of validated contextual rules to a document of the plurality of documents in order to determine labels thereof.

34. The method of claim 33, wherein the set of validated contextual rules (a) take as inputs a value and a value context and (b) output an attribute label for the value.

* * * * *